United States Patent [19]

Schmuck

[11] 3,919,574
[45] Nov. 11, 1975

[54] MOTOR COMMUTATOR DUST SHIELD MEMBER FOR USE IN AN ELECTRICALLY OPERATED DRILLING DEVICE

[75] Inventor: Peter Schmuck, Mauren, Liechtenstein

[73] Assignee: Hilti Aktiengesellschaft, Liechtenstein

[22] Filed: May 20, 1974

[21] Appl. No.: 471,541

[30] Foreign Application Priority Data
May 30, 1973  Germany............................ 2327782

[52] U.S. Cl. ..................... 310/68; 310/50; 310/88; 310/239
[51] Int. Cl.² .......................................... H02K 5/10
[58] Field of Search ............ 310/68, 68 D, 88, 239, 310/50

[56] References Cited
UNITED STATES PATENTS

| | | |
|---|---|---|
| 3,233,130 | 2/1966 | Bates .................................. 310/88 |
| 3,731,126 | 5/1973 | Hagenlocher et al............. 310/88 X |
| 3,745,393 | 7/1973 | Spors.................................. 310/239 |
| 3,813,567 | 5/1974 | Schmuck ....................... 310/239 X |

*Primary Examiner*—J. D. Miller
*Assistant Examiner*—Robert J. Hickey
*Attorney, Agent, or Firm*—Toren, McGeady and Stanger

[57]     ABSTRACT

In a drilling device incorporating a commutator motor, such as used for drilling or chiseling rock, air is drawn through the housing of the device for cooling the motor and a shield member is provided around the commutator to protect it from any foreign particles, such as rock chips or dust, contained in the cooling air. In addition to the enclosure for the commutator, the shield member includes, in a unitary form, the carbon holder for the carbon brushes which cooperate with the commutator. The unitary shield member is formed of an insulating material.

5 Claims, 2 Drawing Figures

MOTOR COMMUTATOR DUST SHIELD MEMBER FOR USE IN AN ELECTRICALLY OPERATED DRILLING DEVICE

SUMMARY OF THE INVENTION

The present invention is directed to a shield member for use in combination with a commutator motor in an electrically operated drilling device, such as is used for drilling and chiseling rock, and, more particularly, it concerns a unitary shield member for protecting the commutator and the carbon brushes.

In drilling devices of the type to which the present invention is applicable, a fan blade is mounted on the shaft of the commutator motor to produce a flow of cooling air over the motor windings.

In known drilling devices utilizing commutator motors, carbon brushes are arranged on the opposite sides of a commutator and are supported in a carbon holder. Spring elements bias the carbon brushes against the commutator. As a result, a portion of the commutator surface is covered, however, the remainder of the surface remains exposed.

As indicated above, fan blades are incorporated with the commutator motor to protect the motor windings from over-heating. The usual practice is to mount the fan blade on the motor shaft so that it draws air through openings in the housing enclosing the motor for passing the cooling air over the windings in the axial direction and then discharging the air through a second set of openings.

If a considerable amount of dust is generated, as is usually the case in rock drilling, a portion of the dust is drawn into the device with the cooling air. The foreign particles in the cooling air are whirled around within the housing by the action of the fan blade. If the dust or other particles, contained in the air flow, contacts the unprotected portion of the commutator, there is the disadvantageous effect that the commutator becomes badly roughened with a resultant wear occurring in the carbon brushes. Further, the foreign particles produce an abrasive effect as well as brush sparking so that the commutator also experiences heavy wear.

Therefore, it is the primary object of the present invention to incorporate a shield member in a drilling device of the type mentioned above so that the extremely high wear to which the commutator and carbon brushes are exposed can be reduced to a very considerable degree.

In accordance with the present invention, the problem, previously experienced in such drills, is solved by enclosing the commutator within a shield member.

By means of the shield member, the commutator is protected from direct impingement by dust and other foreign particles and, as a result, a layer of such particles cannot accumulate on the commutator and lead to premature wear.

Advantageously, the shield is formed as a ring-shape member. In such form the space between the commutator and the shield member can be kept small over the entire circumference of the commutator to direct the cooling air stream for circulation along a portion of the commutator surface.

To enclose all of the normally exposed surfaces of the commutator, the shield member is perferably arranged so that it laterally encloses the surface of the commutator contacted by the carbon brushes. It is advantageous if the commutator is protected not only on the circumference but also over its width. With such an arrangement the unprotected portions of the commutator are kept to a minimum. Alternatively, the shield member can be designed in a multi-part form, with some parts being fastened on the rotor shaft and cooperating with other parts in the manner of a labyrinth seal.

To simplify the stocking of replacement parts for such drilling devices, it is advantageous to design the shield member as a unit incorporating the carbon holder for the carbon brushes. This arrangement facilitates the mounting of the member, so that no special tool cost is necessary.

Moreover, since the carbon brushes must be electrically insulated from one another, it is preferable if the shield member incorporating the carbon holder is made of an insulating material, for example, a plastic, to avoid the need for any separate insulation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figures 1, 2:
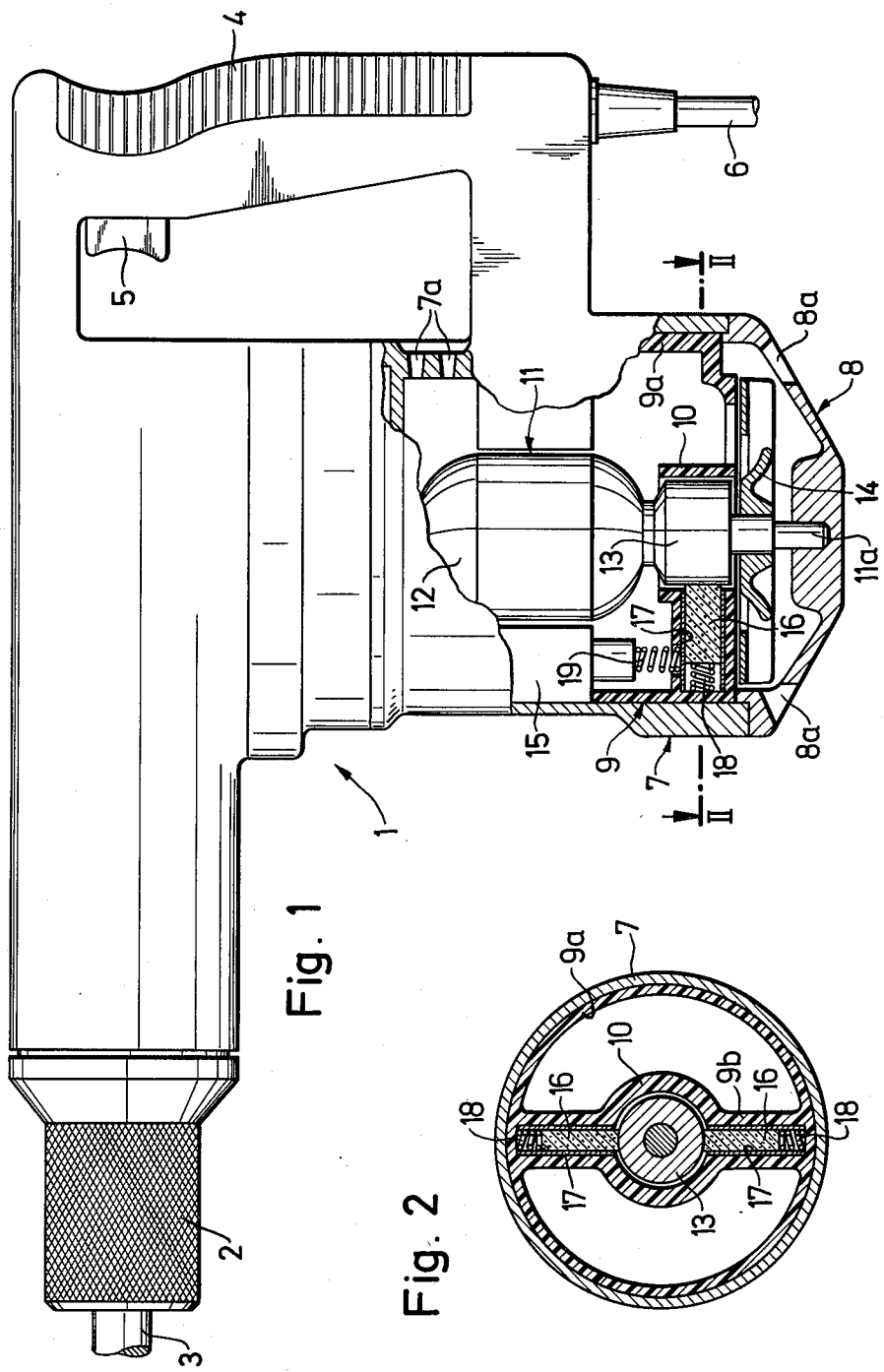
FIG. 1 is a side view, partly in section, of a drilling device embodying the present invention with one of the carbon brushes displaced from its normally oppositely disposed position to the other.
FIG. 2 is a sectional view taken along the line II—II in FIG. 1.

In FIG. 1 a drilling device 1 is illustrated having a barrel-like portion with a tool holder 2 at one end supporting a tool 3. At the opposite end from the tool holder 2, a handle 4 is mounted on the barrel-shaped portion and contains a a pushbutton switch switch 5 and an electric cable 6 which extends outwardly from the handle. Extending downwardly from the barrel-shaped portion and connected to the lower end of the handle is a cylindrically-shaped housing 7 having its axis extending transversely of the axis of the barrel-shaped portion of the device. Positioned within the housing is a commutator motor or rotor 11 on which an armature winding 12, a commutator 13 and fan blade 14 are secured. The lower end of the housing, as viewed in FIG. 1, is closed off by a cover 8 which forms a bearing for the lower rotor shaft end 11a. The fan blade is positioned on the rotor shaft between the commutator 13 and the bearing formed by the cover. When the rotor shaft rotates the fan blade creates a strong air flow within the housing and cooling air is drawn in through the openings 7a located in the housing outwardly from the armature winding 12 and, after the air has passed over the motor windings, it is discharged through other openings 8a located in the cover 8 and spaced from the openings 7a in the axial direction of the housing. The illustrated arrangement of the fan blade 14 is merely exemplary and other arrangements could be used, for example, it would be possible to position the fan blade above the armature windings 12 so that the cooling air passes in the opposite direction through the housing.

A shield member 10 laterally encloses the commutator 13, note FIGS. 1 and 2. As can be seen from the drawings, the shield member 10 is formed as a unitary structure with the carbon holder 9 for the carbon brushes 16. The shield 10 is a ring-shaped member with interruptions or openings to pemit the carbon brushes to extend into contact with the commutator. Similarly, the carbon holder 9 is formed of a ring-shaped guide 9a coaxial with the housing 7 and in contact with its inwardly facing surface. As can be seen in FIG. 2, connecting webs 9b extend inwardly from the guide 9a into the radially inner ring-shaped shield 10. A pair of the connecting webs 9b form a brush guide 17 in which the carbon brushes are positioned so that they are biased inwardly against the commutator 13 by springs 18 located in the radially outer end of the guides. Positioned above the shield 10 and radially outward from the rotor 11 is a stator 15 and the electrical connection from the stator to the brush guides 17 is provided over contact elements 19.

As can be seen in FIG. 2, the combination of the carbon holder 9 and the shield 10, as a unitary member, forms openings through which the cooling air can pass between the inlet openings 7a and the outlet openings 8a. These openings are defined between the inwardly facing surface of the ring-shaped guide 9a and the outwardly facing surfaces of the connecting webs 9b and the ring-shaped shield 10.

While a specific embodiment of the invention has been shown and described in detail to illustrate the application of the inventive principles, it will be understood that the invention may be embodied otherwise without departing from such principles.

What is claimed is:

1. In an electrically operated drilling device, such as used in rock drilling or chiseling operations, comprising a housing, a commutator motor positioned within said housing, said commutator motor including a commutator, carbon brushes positioned around said commutator in angularly spaced relation to one another, a carbon holder located within said housing and arranged to mount said carbon brushes in juxtaposition to said commutator, a motor shaft extending from said motor, a fan blade mounted on said motor shaft for rotation therewith, inlet openings located in one part of said housing, outlet openings located in said housing spaced from said inlet openings so that air can be drawn into said housing by said fan blade through said inlet openings circulated over said commutator motor and exhausted through said outlet openings for cooling said commutator motor, wherein the improvement comprises a shield positioned within said housing and disposed about said commutator to protect it from contact by foreign particles contained in the cooling air circulating through said housing, said shield and said carbon holder joined together as a unitary member, the unitary structure of said shield and carbon holder comprises a first ring-shaped member located within and extending around the inner surface of said housing, a second ring-shaped member in coaxial relationship with said first ring-shaped member spaced radially inwardly from said first ring-shaped member, connecting webs extending between said first and second ring-shaped member and completely enclosing said carbon brushes, and the inner surface of said first ring-shaped member and the opposing surfaces of said connecting webs and said second ring-shaped member defining openings for the passage of air through said housing.

2. In an electrically operated drilling device, as set forth in claim 1, wherein said carbon brushes extend outwardly from said commutator transversely of the axial direction of said shaft, and the unitary structure of said shield and carbon holder being formed of an insulating material with said carbon holder completely enclosing said carbon brushes.

3. In an electrically operated drilling device, as set forth in claim 1, wherein the unitary structure of said shield and carbon holder is formed of an insulating material.

4. In an electrically operated drilling device, such as used in rock drilling or chiseling operations, comprising a housing, a commutator motor positioned within said housing, said commutator motor including a commutator, carbon brushes positioned around said commutator in angularly spaced relation to one another, a carbon holder located within said housing an arranged to mount said carbon brushes in juxtaposition to said commutator, a motor shaft extending from said motor, a fan blade mounted on said motor shaft for rotation therewith, inlet openings located in one part of said housing, outlet openings located in said housing spaced from said inlet openings so that air can be drawn into said housing by said fan blade to said inlet openings circulated over said commutator motor and exhausted through said outlet openings for cooling said commutator motor, wherein the improvement comprises a shield positioned within said housing and disposed about said commutator to protect it from contact by foreign particles contained in the cooling air circulating through said housing, said housing is generally cylindrically shaped with its cylindrical axis arranged in generally parallel relation with the axis of said motor shaft, said inlet and outlet openings being spaced apart in the axial direction of said motor shaft with said commutator located between said inlet and outlet openings, said shield being ring-shaped and having its axis extending parallel with the axis of said motor shaft, said shield laterally enclosing the sides of said commutator which extend in the axial direction of said motor shaft, said carbon brushes extend upwardly from said commutator transversely of the axial direction of said motor shaft, said carbon holder and shield formed as a unitary member of an insulating material with said carbon holder completely enclosing said carbon brushes, said carbon holder comprises a first ring-shaped member coaxial with the cylindrical axis of said housing and disposed in surface contact with the inwardly facing surface of said housing, said shield comprises a second ring-shaped member coaxial with said motor shaft and disposed about and laterally enclosing the surfaces of said commutator extending in the axial direction of said motor shaft, and said carbon holder includes connecting webs connected to and extending between said first and second ring-shaped members for completely enclosing said carbon brushes.

5. In an electrically operated drilling device, as set forth in claim 4, said carbon holder and shield form a plurality of openings extending in the axial direction of said motor shaft and the openings are defined by the inwardly facing surface of said first ring-shaped member, the outwardly facing surfaces of said second ring-shaped member and the surfaces of said connecting webs extending between said first and second members and facing away from said carbon brushes.

* * * * *